US012810699B2

(12) United States Patent
Mv et al.

(10) Patent No.: US 12,810,699 B2
(45) Date of Patent: Nov. 24, 2026

(54) CASSETTE CONFIGURATION FOR AN AUTOMATED TELLER MACHINE

(71) Applicant: Cardtronics USA, Inc., Atlanta, GA (US)

(72) Inventors: Ramana Mv, Telangana (IN); Nagaraju Battini, Hyderabad (IN)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,454

(22) Filed: Dec. 31, 2024

(65) Prior Publication Data

US 2026/0188086 A1 Jul. 2, 2026

(51) Int. Cl.
*G07F 19/00* (2006.01)

(52) U.S. Cl.
CPC .......... *G07F 19/209* (2013.01); *G07F 19/201* (2013.01); *G07F 19/206* (2013.01)

(58) Field of Classification Search
CPC ...... G07F 19/20; G07F 19/201; G07F 19/202; G07F 19/203; G07F 19/206; G07F 19/209; G07D 11/245; G07D 11/25; G07D 11/34
See application file for complete search history.

(56) References Cited

U.S. PATENT DOCUMENTS

| | | | | |
|---|---|---|---|---|
| 11,900,753 | B1 * | 2/2024 | Mande | G07D 11/23 |
| 2005/0189266 | A1 * | 9/2005 | Fujita | G07F 19/205 209/534 |
| 2015/0363991 | A1 | 12/2015 | Yoon et al. | |
| 2024/0038013 | A1 * | 2/2024 | Jang | B65H 31/22 |
| 2024/0312317 | A1 | 9/2024 | Mattison et al. | |
| 2024/0331484 | A1 * | 10/2024 | Jamieson | G06Q 40/02 |

FOREIGN PATENT DOCUMENTS

| | | | | |
|---|---|---|---|---|
| EP | 4439503 | A1 | 10/2024 | |
| KR | 20100078075 | A | 7/2010 | |
| KR | 20240018096 | A * | 2/2024 | G07D 11/245 |

* cited by examiner

*Primary Examiner* — Laura A Gudorf
(74) *Attorney, Agent, or Firm* — Schwegman Lundberg & Woessner, P.A.

(57) ABSTRACT

An example automated teller machine (ATM) may include a first cassette configured to hold a first type of media, a replenishment cassette configured to hold any of a set of types of media, including the first type of media, a bill validator, and a bill conveyor system configured to convey media from the first cassette to the replenishment cassette or from the replenishment cassette through the bill validator to the first cassette. The example ATM may include memory, including instructions, which when executed by processing circuitry, cause the processing circuitry to cause media to be conveyed to or from the replenishment cassette.

20 Claims, 6 Drawing Sheets

CASSETTE CONFIGURATION FOR AN AUTOMATED TELLER MACHINE

BACKGROUND

Note handling devices are machines designed to process, sort, and manage various types of notes. Note handling devices such as automated teller machines (ATMs) typically sort notes by denomination during deposits. These devices often include multiple bins to accommodate different types of notes.

SUMMARY

In various examples, methods and systems for configuring a media holding cassette in an automated teller machine (ATM) are presented.

According to an example, a technique may include receiving, at a remote server from an automated teller machine (ATM), an indication including information corresponding to a set of cassettes of the ATM, determining, at the remote server, a change to a state of a cassette of the set of cassettes based on the information, and sending, a state change instruction, from the remote server to the ATM, the state change instruction causing the ATM to reconfigure media in at least one of the set of cassettes of the ATM.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

The systems and techniques described herein may be used for configuring a media holding cassette in an automated teller machine (ATM). The ATM may be remotely configured to change a cassette, such as to change what denomination the cassette is configured to receive or store. A replenishment cassette in the ATM may be used to refill a cassette, such as when the cassette is depleted or predicted to become depleted. In some examples, the replenishment cassette may be used to store bills while changing a cassette (e.g., changing denomination to be received or stored in the cassette).

Operations of an ATM may include receiving or dispensing media (e.g., currency). ATM use may vary depending on location, clientele, ATM type (e.g., bank branded or independent), or the like. For example, in one location, an ATM may consistently receive deposits of cash (e.g., near a restaurant where servers deposit tips) while another location may consistently dispense cash and run low or out of a particular type of cash (e.g., in a convenience store). In some examples, only a particular currency denomination is deposited or withdrawn from an ATM, with other denominations deposited or withdrawn only rarely. In such cases, after reaching a limit of deposits or when all currency is withdrawn, the frequently used currency may no longer be available for transactions, resulting in inconvenience. For deposits, whenever a cassette is full, an operator is typically dispatched to the ATM to collect the media from the cassette to empty the cassette. For withdrawal, when a cassette is emptied, an operator is dispatched to replenish the media. The systems and techniques described herein provide for remote reconfiguration of a cassette on demand to allocate space for a currency that is in high demand.

The systems and techniques described herein provide capability for remote cassette configuration or automatic replenishment from a replenishment cassette using a remote command. A replenishment cassette may be a type-all cassette (e.g., any media may be stored in the replenishment cassette). When media is to be transferred from the replenishment cassette to any other cassette, the media may be passed through a bill validator to check the currency type of each bill of the media. One or more denominations (e.g., all) may be sent to another cassette from the replenishment cassette, and one or more denominations may be sent back to the replenishment cassette. An ATM configured with a remote replenishment option improves customer experience with the ATM, increases uptime of the ATM (e.g., reduces downtime), or reduces the number of times an operator is dispatched.

Figure 1:
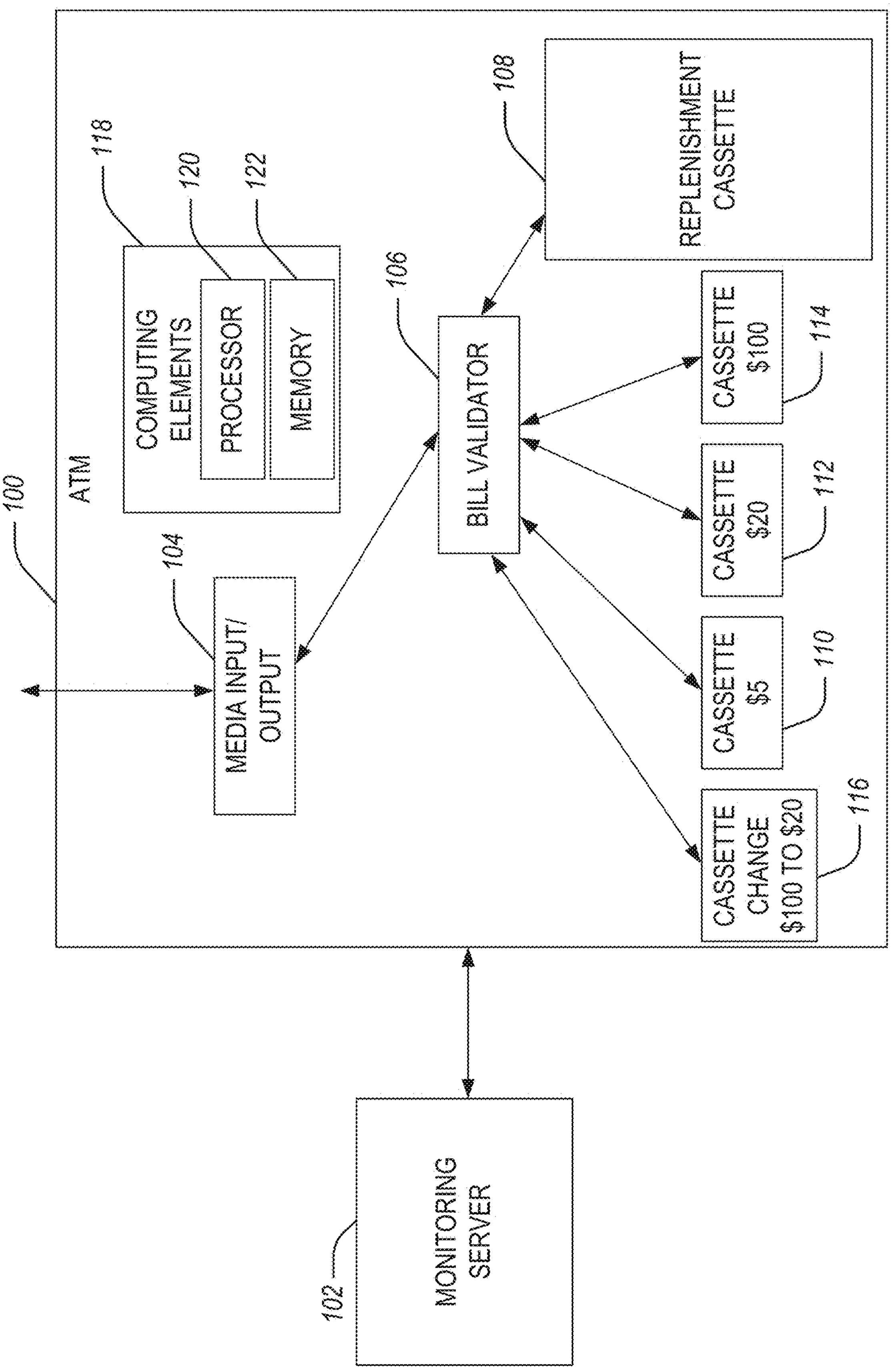
FIG. 1 illustrates generally a schematic diagram of an automated teller machine (ATM) including internal components in accordance with some examples.

FIG. 1 illustrates generally a schematic diagram of an ATM 100 including internal components in accordance with some examples. The ATM 100 includes a media input/output slot 104 to receive or distribute notes. The ATM 100 may include computing elements 118, such as a processor 120 (e.g., processing circuitry) or memory 122 to execute an application for sorting notes or reconfiguring cassettes. The ATM 100 includes one or more cassettes, such as cassettes corresponding to a denomination (e.g., $5 cassette 110, $20 cassette 112, or $100 cassette 114), a cassette that has been changed or is changeable (e.g., cassette 116, which has been or may be changed from $100 to $20), or a replenishment cassette 108. In some examples, the replenishment cassette 108 may be larger that the other cassettes, for example the replenishment cassette 108 may include two or more cassettes.

The ATM 100 may include a bill validator 106, such as using a camera, a sensor, or the like to recognize a note. Firmware stored in the computing elements 118 may be used to determine which note was inserted into the media input/output slot 104 or via one of the cassettes. A note may be recognized by comparing the note to a template (e.g., stored in the computing elements 118). The template may be used to define what notes are supported by the ATM 100, including optionally more than one currency. The template may be certified (e.g., by a central bank). The bill validator 106 may be used to validate a note when moving the note from one cassette to another (e.g., from the replenishment cassette 108 to the cassette 116).

The ATM 100 may be in communication with a monitoring server 102. The monitoring server 102 may receive telemetry data from the ATM 100, such as what bills are received (e.g., via the bill validator 106), cassette status for each cassette (e.g., total number of bills, available space, denominations available in the replenishment cassette 108, etc.), frequency of use, or the like. The monitoring server 102 may send a reconfiguration command to the ATM 100 to change a cassette to a different denomination, to remove bills from a cassette and place them in the replenishment cassette 108, to move bills from the replenishment cassette 108 to another cassette, or the like.

In an example, cassette 116 may be a first cassette configured to hold a first type of media (e.g., $100 bills). The replenishment cassette 108 may be configured to hold any of a set of types of media, including the first type of media. A bill conveyor system (e.g., including the arrow between the replenishment cassette 108 and the bill validator 106 or other arrows between the bill validator 106 and other cassettes), may be configured to convey media from cassette 116 to the replenishment cassette 108 or from the replenishment cassette 108 to the cassette 116 (e.g., via the bill validator 106). The processor 120 may be used to cause media to be conveyed to or from the replenishment cassette 108 (e.g., in response to an instruction received at the computing elements 118 by the monitoring server 102 or stored in the memory 122). The processor 120 may receive an indication from the monitoring server 102, which may be remote to the location of the ATM 100, to transfer media of the first type of media from the cassette 116 to the replenishment cassette 108, and in response cause the media to be conveyed from the cassette 116 to the replenishment cassette 108. The indication may be received in response to sending an indication to the monitoring server 102 that the cassette 116 is full.

The processor 120 may receive an indication from the monitoring serve 102 to transfer media of a first type of media from the replenishment cassette 108 to the cassette 116, and in response cause the media to be conveyed from the replenishment cassette 108 to the cassette 116, for example via the bill validator 106. The indication may be received in response to sending an indication, to the monitoring server 102, that a cassette is empty of the first type of media or cannot complete a transaction due to a deficiency of the first type of media in the cassette. In some examples, all media or a threshold amount of media may be moved from the replenishment cassette 108 to other cassettes via the bill validator 106. In other examples, only one or a set of media may be transferred to one or more other cassettes from the replenishment cassette 108 via the bill validator 106, with media not to be transferred returned to the replenishment cassette 108 from the bill validator 106. The processor 120 may receive an indication from the monitoring server 102 to change the cassette 116 from holding the first type of media (e.g., $100 bills) to a second type of media (e.g., $20 bills). The bill conveyor system may move media of the first type of media from the cassette 116 to the replenishment cassette 108. In some examples, media of the second type of media may be moved from the replenishment cassette 108 to the cassette 116 after the media of the first type of media is removed from the cassette 116. In other examples, the cassette 116 may be left empty so that the second type of media may be deposited into the cassette 116.

In an example, when users of the ATM 100 mostly deposit $100 bills and do not perform any deposits of $20, the $100 bill cassette is filled quickly, and the cassette with $20 is empty. In this example, the monitoring server 102 may send an indication to reconfigure the cassettes. For example, all the $20 bills in the $20 cassette may be moved to the replenishment cassette 108 and the $20 cassette may be configured to receive $100 bills.

Consider a case in which $100 bills are being withdrawn more frequently than $20. In this case, a remote configuration option may be used to configure the $20 cassette to accept $100 bills and unused $20 bills may be moved to the replenishment cassette 108. The newly reconfigured $100 bills cassette may be filled with $100 bills from the replenishment cassette 108.

When the ATM 100 is serviced, an operator may put notes into the replenishment cassette 108 according to the projected use of the ATM 100. As discussed further below, a machine learning model (e.g., run at the monitoring server 102) may be used to determine likely or projected future use of the ATM 100. The ATM 100 may be disabled from transactions when changing a cassette or moving money to or from the replenishment cassette 108, and the changes may be performed during a low traffic time (e.g., at night).

Figure 2A:
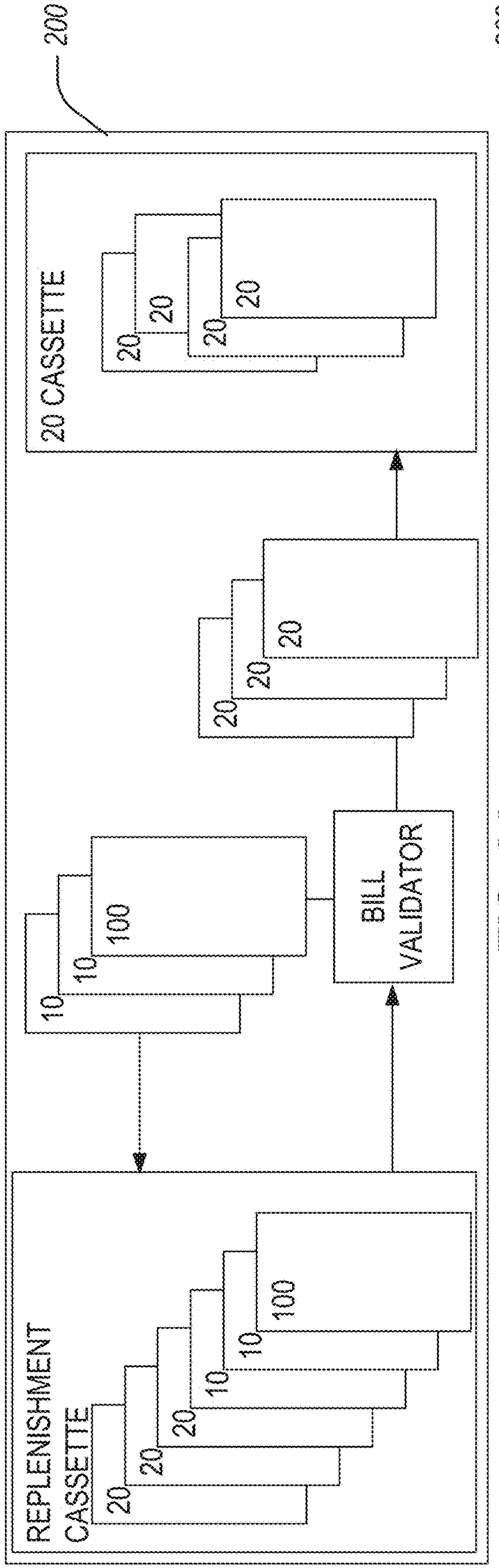
FIGS. 2A-2B and 3 illustrate example media pathways through an ATM in accordance with some examples.
Figure 2B:
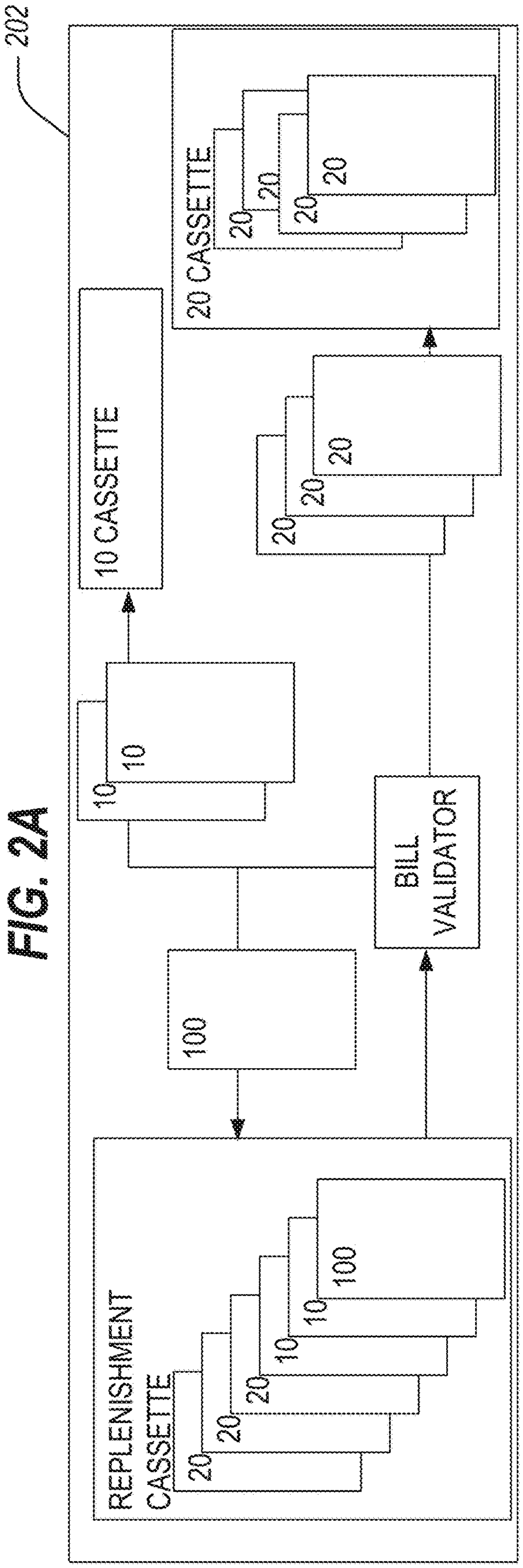
Figure 3:
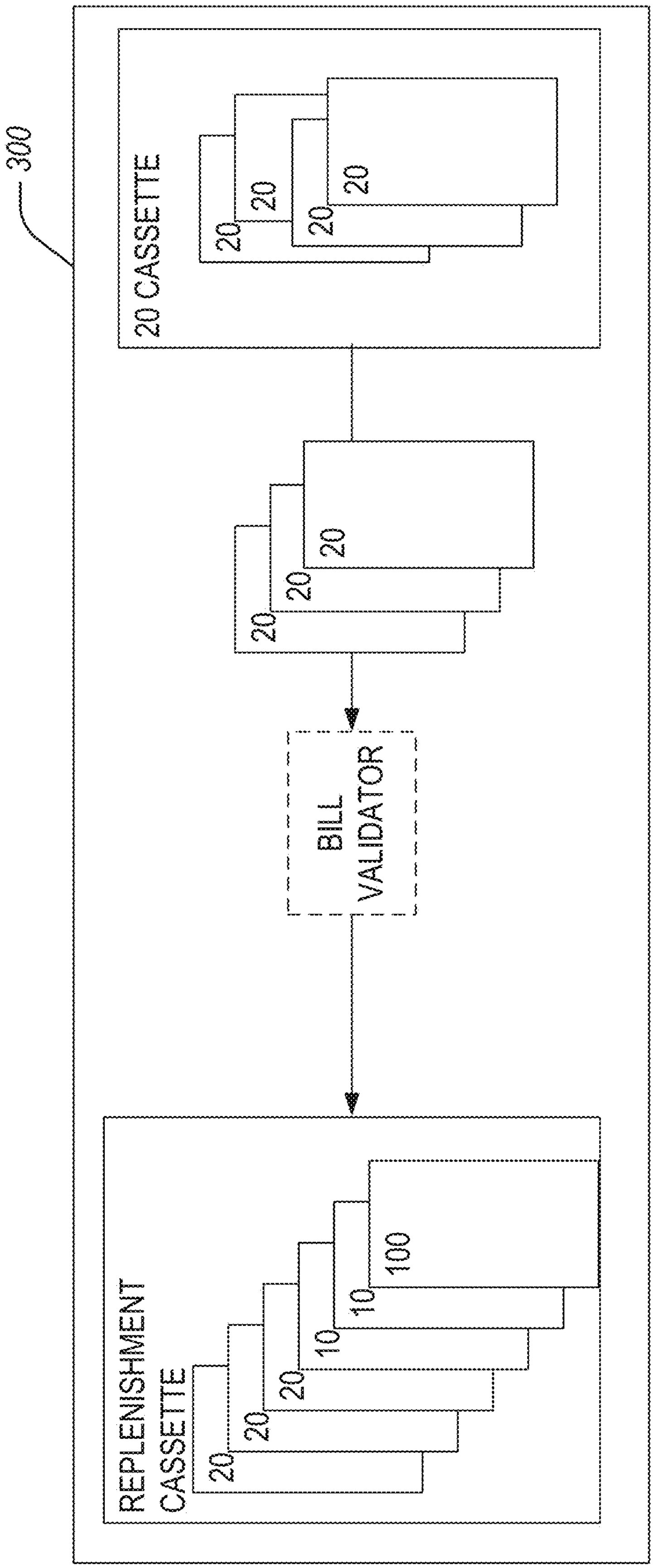

FIGS. 2A-2B and 3 illustrate example media pathways 200 and 202 through an ATM in accordance with some examples.

FIG. 2A illustrates a first media pathway 200 where a replenishment cassette has various denominations including 20, 10, and 100. In the example of FIG. 2A, six bills are shown for convenience, but fewer or more (e.g., tens, hundreds) may be used in the first media pathway 200. The six bills go to a bill validator from the replenishment cassette. The bill validator is used to determine which bills correspond to a cassette that is to be replenished, in this case a 20 cassette. The bill validator identifies the three 20 bills and these three 20 bills are conveyed to the 20 cassette. The other three bills, two 10 bills and a 100 bill are identified by the bill validator and returned to the replenishment cassette because they are not 20 bills.

FIG. 2B illustrates a second media pathway 202 where a replenishment cassette has various denominations including 20, 10, and 100. In the example of FIG. 2B, six bills are shown for convenience, but fewer or more (e.g., tens, hundreds) may be used in the second media pathway 202. The six bills go to a bill validator from the replenishment cassette. The bill validator is used to determine which bills correspond to a cassette that is to be replenished, in this case both a 10 cassette and a 20 cassette. The bill validator identifies the three 20 bills and these three 20 bills are conveyed to the 20 cassette. The bill validator identifies the two 10 bills and these two 10 bills are conveyed to the 10 cassette. The last bill, a 100 bill, is identified by the bill validator and returned to the replenishment cassette because it is not a 10 bill or a 20 bill.

In some examples, a third media pathway may include distributing all bills in the replenishment cassette to corresponding cassettes. In other examples, a fourth media pathway may include distributing a portion of bills in the replenishment cassette (e.g., a threshold number) to one or more corresponding cassettes. For example, the replenishment cassette may send bills one by one or in sets (e.g., five, ten, etc.) to the bill validator in the fourth media pathway. The bill validator may determine the bill type, and distribute the bill to a cassette, return the bill to the replenishment cassette, send the bill to another cassette (e.g., a second replenishment cassette, or a portion of the replenishment cassette, such as when the replenishment cassette includes two or more cassettes), or hold the bill. When a threshold number of bills have been sent to a cassette for replenishing the cassette from the replenishment cassette, any remaining bills may be sent back to the replenishment cassette, or the replenishment cassette may stop sending bills to the bill validator.

FIG. 3 illustrates a fifth media pathway 300 where a replenishment cassette has various denominations including 20, 10, and 100, and a 20 cassette has a set of 20 bills. In the example of FIG. 3, three bills are shown leaving the 20 cassette for convenience, but fewer or more (e.g., tens, hundreds) may be used in the fifth media pathway 300. The three 20 bills optionally go to the bill validator from the 20 cassette for verification. In some examples, the three 20 bills are known to be 20 bills because they were in the 20 cassette, and they can bypass the bill validator on the way to the replenishment cassette. In other examples, due to how a conveyor system is configured in the ATM, the three 20 bills may be sent through the bill validator (optionally without validation) on the way to the replenishment cassette.

Figure 4:
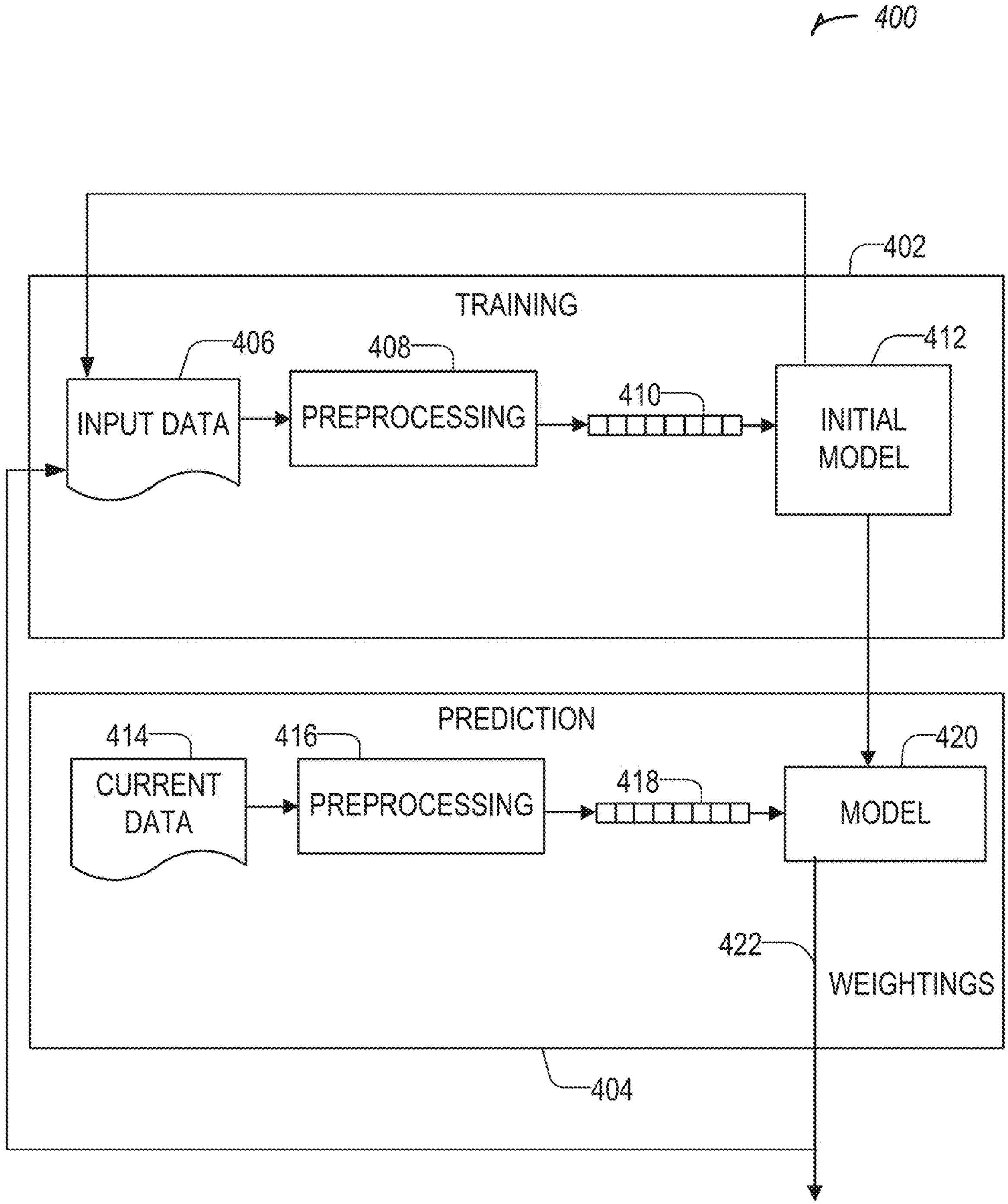
FIG. 4 illustrates a machine learning engine for training and execution related to configuring a media holding cassette in an ATM in accordance with some examples.

FIG. 4 illustrates a machine learning engine for training and execution related to configuring a media holding cassette in an ATM in accordance with some examples. The machine learning engine may be deployed to execute at a mobile device (e.g., a cell phone, a tablet, etc.) or a computer (e.g., a desktop, a laptop, etc.). FIG. 4 shows an example machine learning engine 400 according to some examples of the present disclosure.

Machine learning engine 400 uses a training engine 402 and a prediction engine 404. Training engine 402 uses input data 406, for example after undergoing preprocessing component 408, to determine one or more features 410. The one or more features 410 may be used to generate an initial model 412, which may be updated iteratively or with future labeled or unlabeled data (e.g., during reinforcement learning), for example to improve the performance of the prediction engine 404 or the initial model 412. An improved model may be redeployed for use.

The input data 406 may include historical use of an ATM, current cassette configuration, preferred cassette configuration, amount of bills in the ATM (e.g., in each cassette), size of a replenishment cassette, size of other cassettes, nearby events in the future that may affect ATM usage, past nearby events that affected ATM usage, a replenishment schedule, a desired replenishment schedule, or the like.

In the prediction engine 404, current data 414 (e.g., current amount of bills in the ATM (e.g., in each cassette), size of a replenishment cassette, size of other cassettes, nearby events in the future that may affect ATM usage, a replenishment schedule, a desired replenishment schedule, or the like) may be input to preprocessing component 416. In some examples, preprocessing component 416 and preprocessing component 408 are the same. The prediction engine 404 produces feature vector 418 from the preprocessed current data, which is input into the model 420 to generate one or more criteria weightings 422. The criteria weightings 422 may be used to output a prediction, as discussed further below.

The training engine 402 may operate in an offline manner to train the model 420 (e.g., on a server). The prediction engine 404 may be designed to operate in an online manner (e.g., in real-time, at a mobile device, on a wearable device, etc.). In some examples, the model 420 may be periodically updated via additional training (e.g., via updated input data 406 or based on labeled or unlabeled data output in the weightings 422) or based on identified future data, such as by using reinforcement learning to personalize a general model (e.g., the initial model 412) to a particular user.

Labels for the input data 406 may include whether a cassette was depleted, whether a cassette was unable to dispense media, whether a cassette was full, whether the ATM had a reconfiguration of cassette denominations, whether service was required out of schedule, whether media was transferred to or from a replenishment cassette, or the like.

The initial model 412 may be updated using further input data 406 until a satisfactory model 420 is generated. The model 420 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 402 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 402. In an example embodiment, a regression model is used and the model 420 is a vector of coefficients corresponding to a learned importance for each of the features in the vector of features 410, 418. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 420 may output a prediction, such as a configuration of media in one or more cassettes (e.g., a replenishment cassette or a denomination cassette), a predicted schedule for service by an operator, a likely time a reconfiguration will be needed, a cassette configuration (e.g., which cassettes should be assigned to which denominations), or the like.

Figure 5:
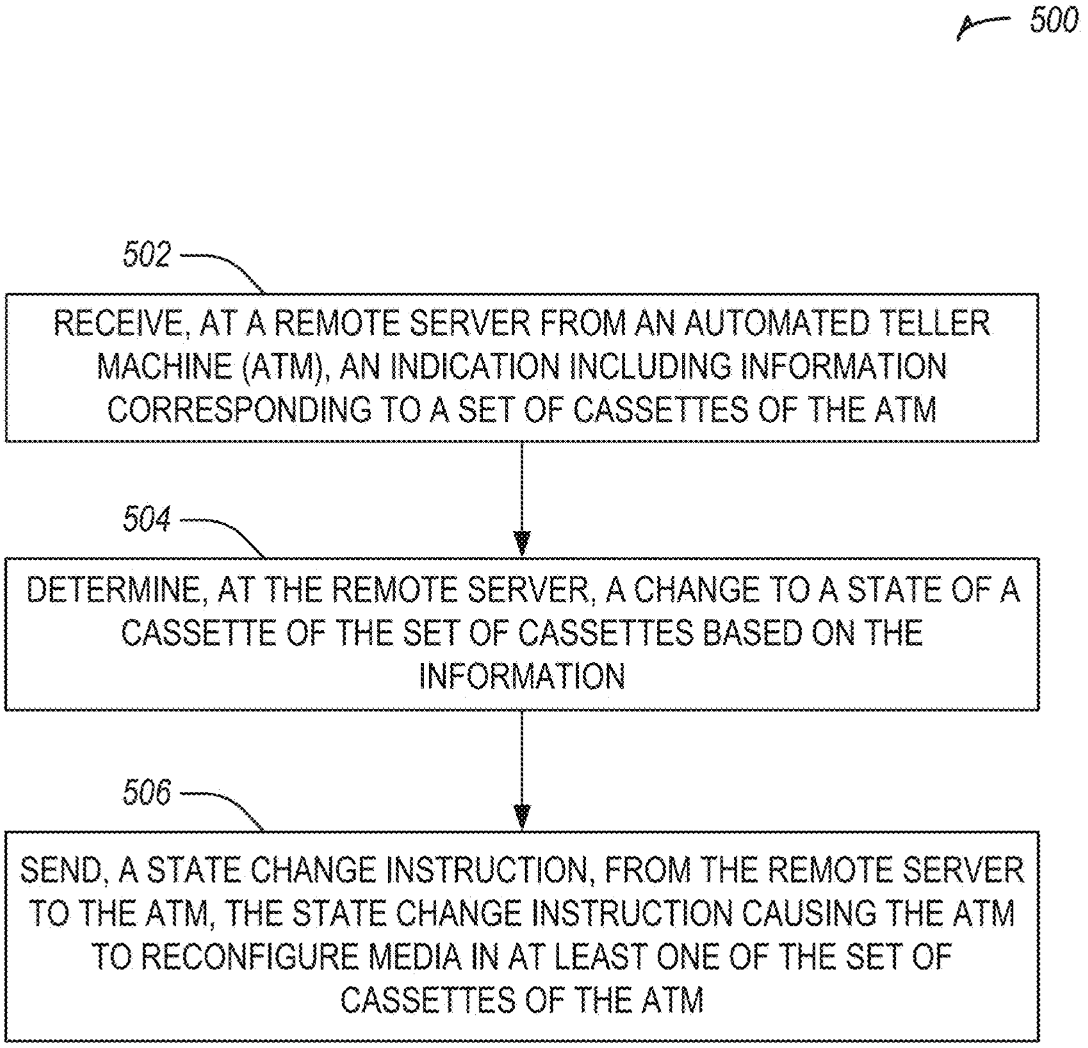
FIG. 5 illustrates generally a flowchart showing a technique for configuring a media holding cassette in an ATM in accordance with some examples.

FIG. 5 illustrates generally a flowchart showing a technique 500 for configuring a media holding cassette in an ATM in accordance with some examples. The technique 500 includes an operation 502 to receive, at a remote server from an ATM, an indication including information corresponding to a set of cassettes of the ATM.

The technique 500 includes an operation 504 to determine, at the remote server, a change to a state of a cassette of the set of cassettes based on the information. In an example, operation 504 includes determining, using a machine learning trained model, a likelihood that the cassette will become full or empty at a future time, and wherein the change to the state includes removing or adding media based on the likelihood. In this example, the technique 500 may include outputting information to a service operator device indicating that media is to be removed or added to the cassette preemptively based on the likelihood. In this example, a state change instruction may cause the ATM to transfer media to or from a replenishment cassette based on the likelihood.

The technique 500 includes an operation 506 to send, a state change instruction, from the remote server to the ATM, the state change instruction causing the ATM to reconfigure media in at least one of the set of cassettes of the ATM. Operation 506 may include causing the ATM to transfer media of the at least one other type of media to a second cassette. The state change instruction may cause the ATM to return media of the at least one other type of media from a bill validator back to the replenishment cassette. In an example, the change to the state of the cassette includes changing the cassette from holding a first type of media to holding a second type of media. In this example, the state change instruction may cause media of the first type of media to be removed from the cassette. In this example, the state change instruction may further cause media of the second type of media to be added to the cassette after the media of the first type of media is removed.

In an example, the information indicates that, for the cassette corresponding to a first type of media, the state is full. In this example, the state change instruction may cause the ATM to transfer media of the first type of media from the cassette to a replenishment cassette. In another example, information indicates that, for the cassette corresponding to a first type of media, the state is empty of the first type of media or cannot complete a transaction due to a deficiency of the first type of media. In this example, the state change instruction may cause the ATM to transfer media of the first type of media to the cassette from a replenishment cassette, the replenishment cassette having at least one other type of media.

Figure 6:
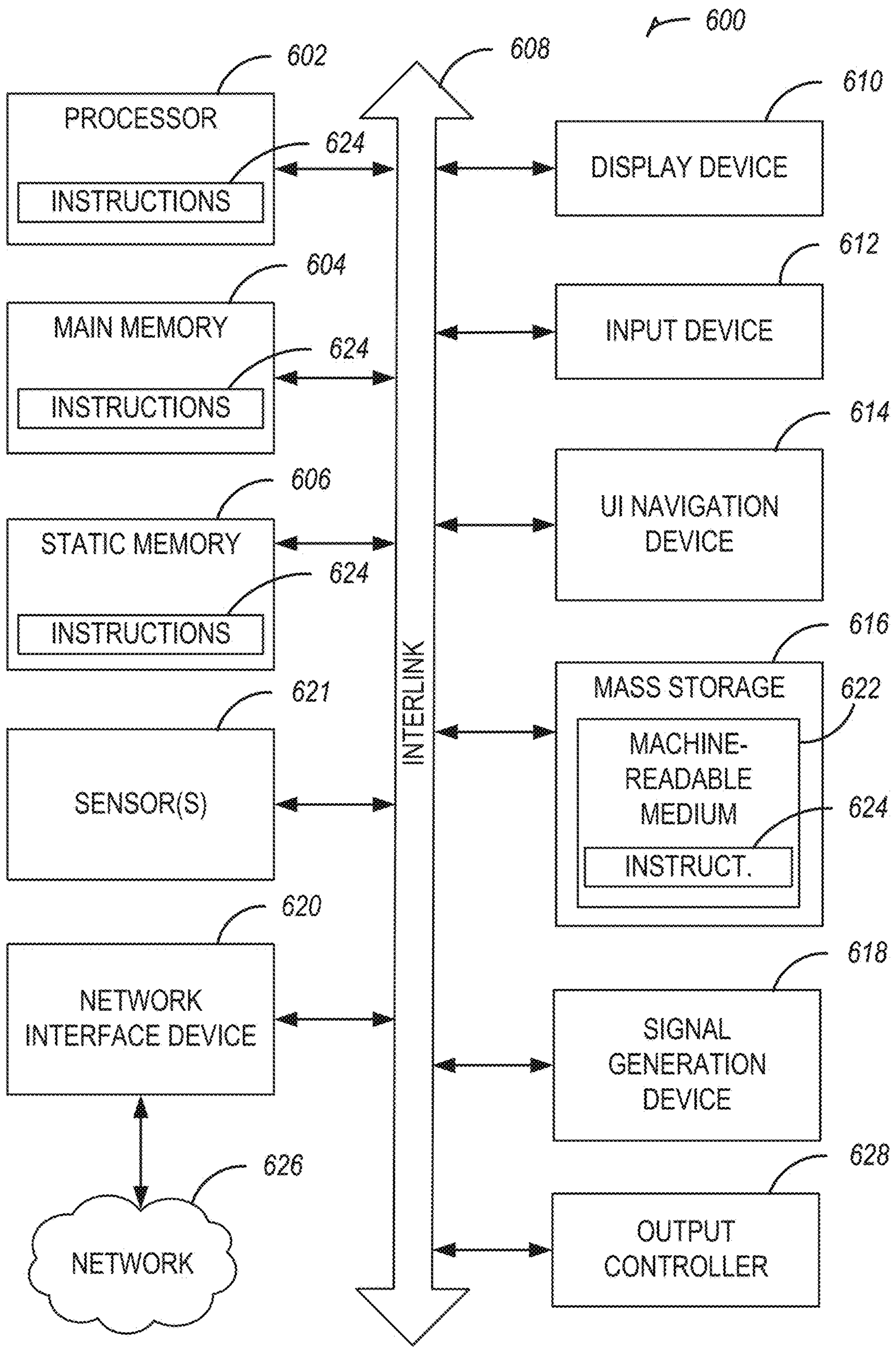
FIG. 6 illustrates generally an example of a block diagram of a machine upon which any one or more of the techniques discussed herein may perform in accordance with some examples.

FIG. 6 illustrates generally an example of a block diagram of a machine upon which any one or more of the techniques discussed herein may perform, according to various examples. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

Each of these non-limiting examples may stand on its own, or may be combined in various permutations or combinations with one or more of the other examples.

Example 1 is an automated teller machine (ATM) comprising: a first cassette configured to hold a first type of media; a replenishment cassette configured to hold any of a set of types of media, including the first type of media; a bill validator; a bill conveyor system configured to convey media from the first cassette to the replenishment cassette or from the replenishment cassette through the bill validator to the first cassette; processing circuitry; and memory, including instructions, which when executed by the processing circuitry, cause the processing circuitry to cause media to be conveyed to or from the replenishment cassette.

In Example 2, the subject matter of Example 1 includes, wherein the instructions further cause the processing circuitry to receive an indication, from a remote server, to transfer media of the first type of media from the first cassette to the replenishment cassette, and in response, to cause the media to be conveyed from the first cassette to the replenishment cassette.

In Example 3, the subject matter of Example 2 includes, wherein the indication is received in response to instructions that further cause the processing circuitry to send an indication, to the remote server, that the first cassette is full.

In Example 4, the subject matter of Examples 1-3 includes, wherein the instructions further cause the processing circuitry to receive an indication, from a remote server, to transfer media of the first type of media from the replenishment cassette to the first cassette, and in response, to cause the media to be conveyed from the replenishment cassette to the first cassette via the bill validator.

In Example 5, the subject matter of Example 4 includes, wherein the instructions to cause the media to be conveyed from the replenishment cassette to the first cassette via the bill validator include instructions to cause all media in the replenishment cassette to be conveyed through the bill validator and return any media not of the first type of media back to the replenishment cassette.

In Example 6, the subject matter of Examples 4-5 includes, wherein the indication is received in response to instructions that further cause the processing circuitry to send an indication, to the remote server, that the first cassette is empty of the first type of media or cannot complete a transaction due to a deficiency of the first type of media in the first cassette.

In Example 7, the subject matter of Examples 1-6 includes, wherein the instructions further cause the processing circuitry to receive an indication, from a remote server, to change the first cassette from being configured to hold the first type of media to being configured to hold a second type of media, and wherein the bill conveyor system is further configured to move media of the first type of media from the first cassette to the replenishment cassette based on the indication.

In Example 8, the subject matter of Example 7 includes, wherein the bill conveyor system is further configured to move media of the second type of media from the replenishment cassette to the first cassette based on the indication.

Example 9 is a method comprising: receiving, at a remote server from an automated teller machine (ATM), an indication including information corresponding to a set of cassettes of the ATM; determining, at the remote server, a change to a state of a cassette of the set of cassettes based on the information; and sending, a state change instruction, from the remote server to the ATM, the state change instruction causing the ATM to reconfigure media in at least one of the set of cassettes of the ATM.

In Example 10, the subject matter of Example 9 includes, wherein the information indicates that, for the cassette corresponding to a first type of media, the state is full, and wherein the state change instruction causes the ATM to transfer media of the first type of media from the cassette to a replenishment cassette.

In Example 11, the subject matter of Examples 9-10 includes, wherein the information indicates that, for the cassette corresponding to a first type of media, the state is empty of the first type of media or cannot complete a transaction due to a deficiency of the first type of media, and wherein the state change instruction causes the ATM to transfer media of the first type of media to the cassette from a replenishment cassette, the replenishment cassette having at least one other type of media.

In Example 12, the subject matter of Example 11 includes, wherein the state change instruction causes the ATM to transfer media of the at least one other type of media to a second cassette.

In Example 13, the subject matter of Examples 11-12 includes, wherein the state change instruction causes the ATM to return media of the at least one other type of media from a bill validator back to the replenishment cassette.

In Example 14, the subject matter of Examples 9-13 includes, wherein the change to the state of the cassette includes changing the cassette from holding a first type of media to holding a second type of media, and wherein the state change instruction causes media of the first type of media to be removed from the cassette.

In Example 15, the subject matter of Example 14 includes, wherein the state change instruction further causes media of the second type of media to be added to the cassette after the media of the first type of media is removed.

In Example 16, the subject matter of Examples 9-15 includes, wherein determining the change to the state of the cassette includes determining, using a machine learning trained model, a likelihood that the cassette will become full or empty at a future time, and wherein the change to the state includes removing or adding media based on the likelihood.

In Example 17, the subject matter of Example 16 includes, outputting information to a service operator device indicating that media is to be removed or added to the cassette preemptively based on the likelihood.

In Example 18, the subject matter of Examples 16-17 includes, wherein the state change instruction further causes the ATM to transfer media to or from a replenishment cassette based on the likelihood.

Example 19 is at least one machine-readable medium including instructions, which when executed by processing circuitry, cause the processing circuitry to perform operations comprising: receiving, at a remote server from an automated teller machine (ATM), an indication including information corresponding to a set of cassettes of the ATM; determining, at the remote server, a change to a state of a cassette of the set of cassettes based on the information; and sending, a state change instruction, from the remote server to the ATM, the state change instruction causing the ATM to reconfigure media in at least one of the set of cassettes of the ATM.

In Example 20, the subject matter of Example 19 includes, wherein the information indicates that, for the cassette corresponding to a first type of media, the state is full, and wherein the state change instruction causes the ATM to transfer media of the first type of media from the cassette to a replenishment cassette.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An automated teller machine (ATM) comprising:

a first cassette configured to hold a first type of media;

a replenishment cassette configured to hold any of a set of types of media, including the first type of media;

a bill validator;

a bill conveyor system configured to convey media from the replenishment cassette through the bill validator to the first cassette;

processing circuitry; and memory, including instructions, which when executed by the processing circuitry, cause the processing circuitry to:

cause all media in the replenishment cassette to be conveyed from the replenishment cassette in a single pass through the bill validator including conveying a first portion of media corresponding to the first type of media through the bill validator and then directly to the first cassette, and including returning any media not of the first type of media from the bill validator directly back to the replenishment cassette.

2. The ATM of claim 1, wherein the instructions further cause the processing circuitry to receive an indication, from a remote server, to transfer media of the first type of media from the first cassette to the replenishment cassette, and in response, to cause the media to be conveyed from the first cassette to the replenishment cassette.

3. The ATM of claim 2, wherein the indication is received in response to instructions that further cause the processing circuitry to send an indication, to the remote server, that the first cassette is full.

4. The ATM of claim 1, wherein the instructions further cause the processing circuitry to receive an indication, from a remote server, to transfer media of the first type of media from the replenishment cassette to the first cassette, and in response, to cause the media to be conveyed from the replenishment cassette to the first cassette via the bill validator.

5. The ATM of claim 4, wherein the instructions to cause the media to be conveyed from the replenishment cassette to the first cassette via the bill validator include instructions to cause all media in the replenishment cassette to be conveyed through the bill validator and return any media not of the first type of media back to the replenishment cassette.

6. The ATM of claim 4, wherein the indication is received in response to instructions that further cause the processing circuitry to send an indication, to the remote server, that the first cassette is empty of the first type of media or cannot complete a transaction due to a deficiency of the first type of media in the first cassette.

7. The ATM of claim 1, wherein the instructions further cause the processing circuitry to receive an indication, from a remote server, to change the first cassette from being configured to hold the first type of media to being configured to hold a second type of media, and wherein the bill conveyor system is further configured to move media of the first type of media from the first cassette to the replenishment cassette based on the indication.

8. The ATM of claim 7, wherein the bill conveyor system is further configured to move media of the second type of media from the replenishment cassette to the first cassette based on the indication.

9. A method comprising:

receiving, at a remote server from an automated teller machine (ATM), an indication including information corresponding to a set of cassettes of the ATM;

determining, at the remote server, a change to a state of a cassette of the set of cassettes based on the information; and sending, a state change instruction, from the remote server to the ATM, the state change instruction causing the ATM to reconfigure media in at least one of the set of cassettes of the ATM, wherein the state change instruction causes the ATM to convey all media in a replenishment cassette of the ATM in a single pass through a bill validator of the ATM including conveying a first portion of media corresponding to the change to the state through the bill validator and then directly to the cassette, and including returning any media not of the first portion of media from the bill validator directly back to the replenishment cassette.

10. The method of claim 9, wherein the information indicates that, for the cassette corresponding to a first type of media, the state is full, and wherein the state change instruction causes the ATM to transfer media of the first type of media from the cassette to a replenishment cassette.

11. The method of claim 9, wherein the information indicates that, for the cassette corresponding to a first type of media, the state is empty of the first type of media or cannot complete a transaction due to a deficiency of the first type of media, and wherein the state change instruction causes the ATM to transfer media of the first type of media to the cassette from a replenishment cassette, the replenishment cassette having at least one other type of media.

12. The method of claim 11, wherein the state change instruction causes the ATM to transfer media of the at least one other type of media to a second cassette.

13. The method of claim 11, wherein the state change instruction causes the ATM to return media of the at least one other type of media from a bill validator back to the replenishment cassette.

14. The method of claim 9, wherein the change to the state of the cassette includes changing the cassette from holding a first type of media to holding a second type of media, and wherein the state change instruction causes media of the first type of media to be removed from the cassette.

15. The method of claim 14, wherein the state change instruction further causes media of the second type of media to be added to the cassette after the media of the first type of media is removed.

16. The method of claim 9, wherein determining the change to the state of the cassette includes determining, using a machine learning trained model, a likelihood that the cassette will become full or empty at a future time, and wherein the change to the state includes removing or adding media based on the likelihood.

17. The method of claim 16, further comprising outputting information to a service operator device indicating that media is to be removed or added to the cassette preemptively based on the likelihood.

18. The method of claim 16, wherein the state change instruction further causes the ATM to transfer media to or from a replenishment cassette based on the likelihood.

19. At least one machine-readable medium including instructions, which when executed by processing circuitry, cause the processing circuitry to perform operations comprising:

receiving, at a remote server from an automated teller machine (ATM), an indication including information corresponding to a set of cassettes of the ATM;

determining, at the remote server, a change to a state of a cassette of the set of cassettes based on the information; and sending, a state change instruction, from the remote server to the ATM, the state change instruction causing the ATM to reconfigure media in at least one of the set of cassettes of the ATM, wherein the state change instruction causes the ATM to convey all media in a replenishment cassette of the ATM in a single pass through a bill validator of the ATM including conveying a first portion of media corresponding to the change to the state through the bill validator and then directly to the cassette, and including returning any media not of the first portion of media from the bill validator directly back to the replenishment cassette.

20. The at least one machine-readable medium of claim 19, wherein the information indicates that, for the cassette corresponding to a first type of media, the state is full, and wherein the state change instruction causes the ATM to transfer media of the first type of media from the cassette to a replenishment cassette.

* * * * *